April 1, 1952  O. H. DICKE  2,591,054
SUSTAINED POWER ELECTRIC CLOCK
Filed Aug. 9, 1945
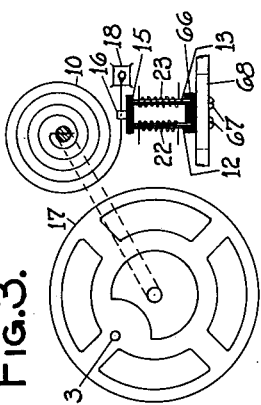
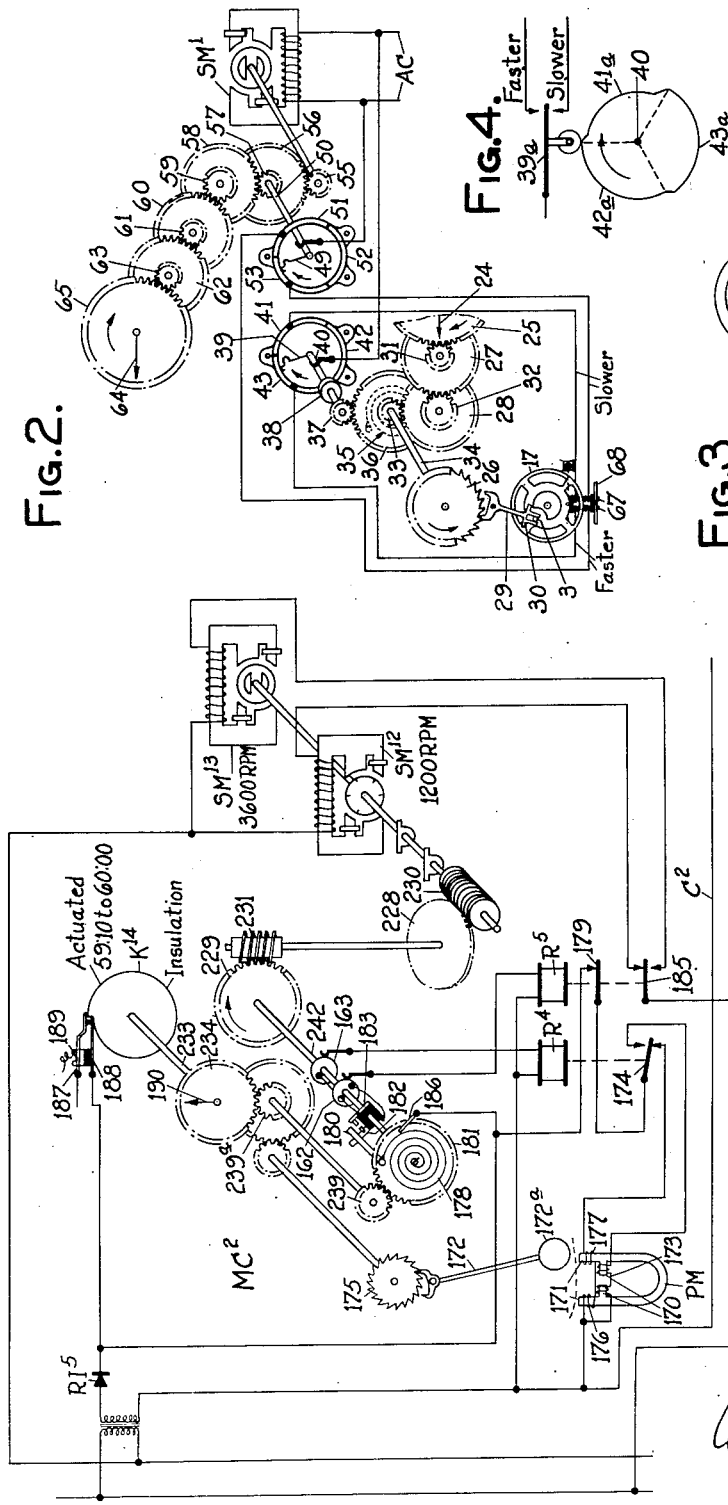
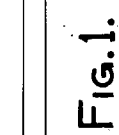
INVENTOR.
O. H. Dicke Patented Apr. 1, 1952

2,591,054

UNITED STATES PATENT OFFICE 2,591,054

SUSTAINED POWER ELECTRIC CLOCK

Oscar H. Dicke, Rochester, N. Y., assignor to International Business Machines Corporation, New York, N. Y., a corporation of New York Application August 9, 1945, Serial No. 609,808

14 Claims. (Cl. 58—26)

The present invention relates to clocks and more particularly to electric clocks of the sustained power type.

By "sustained power electric clock" is meant a clock having synchronous alternating current motor features, but which is capable of sustained operation during an alternating current power failure.

This application is a continuation-in-part of my prior application Ser. No. 472,698 filed January 18, 1943, which now Patent No. 2,490,340, granted December 6, 1949, is a division of my prior application Ser. No. 245,700 filed December 14, 1938, now Patent No. 2,313,466 granted March 9, 1943.

An object of the present invention resides in the provision of a sustained power electric clock in which one element of the clock is only operated during the supply of alternating current to the clock, said element being temporarily operated at increased speed after each current cessation.

Another object of the present invention resides in the provision of means to accelerate mechanical clock mechanism when it is tardy with respect to a synchronous motor and to retard such clock mechanism when it is fast with respect to such synchronous motor during the presence of alternating current and to adjust its time measuring mechanism to normal speed during a cessation of alternating current. The alternating current mentioned is derived from a source having its frequency regulated to manifest accurately the passing of time.

Another object of the present invention resides in the provision of means for regulating the speed of an escapement mechanism by a synchronous motor located at a remote point.

Other objects, purposes and characteristic features and their advantages will appear from the following description when considered in the light of the drawings in which:

Fig. 1 illustrates a sustained power electric clock in which the period of oscillation of an oscillatory mechanism is adjusted electro-magnetically to any one of fast, slow or normal speed conditions;

Fig. 2 illustrates a sustained power electric clock in which the effective length of a hairspring is adjusted to have a long, short or medium effective length through the medium of electro-thermal-responsive means;

Fig. 3 illustrates on an enlarged scale the balance wheel, hair-spring and the electro-thermal-responsive means of the clock mechanism illustrated in Fig. 2; and Fig. 4 shows a modified form of contact mechanism.

Referring to Fig. 1 of the drawings which illustrates a clock having an escapement clock structure in which the pendulum is not braked like it is in Fig. 2 of my Patent No. 2,359,973 granted October 10, 1944, nor cycle dominated like it is in my Patent No. 2,248,165, dated July 8, 1941, but in which it is controlled or regulated so as to at times run faster or slower than its normal adjusted correct time measuring operating rate. In this construction, which has been shown very conventionally, there is preferably provided a permanent magnet PM which has leakage poles of soft iron 170 projecting inwardly from the poles of the permanent magnet. It is also provided with soft iron extensions 171. This permanent magnet is placed directly below the pendulum 172 having a soft iron bob 172ᵃ and the pendulum is then adjusted to keep correct time. The leakage poles are provided with a sucking winding 173, so to speak, which is at times energized by direct current derived from the regulated alternating current system through the medium of a rectifier RI⁵ and flowing through the front contact 179 of relay R⁵ and the front contact 174 of the relay R⁴. The flow of this current is in such a direction through the winding 173 that the magnetomotive force produced thereby aids the magnetomotive force of the permanent magnet and causes a large part of the flux emitted by said permanent magnet to be diverted away from the pendulum so that gravity is no longer magnetically aided to any appreciable extent and the pendulum operates at a lower frequency. In a similar manner the soft iron extensions 171 are provided with boosting windings 176 and 177 which when energized by direct current derived through the rectifier RI⁵ through the front contact 179 of relay R⁵, and the back contact 174 of relay R⁴ causes the apparent strength of the permanent magnet PM to be increased thereby still further magnetically aiding gravity and causing the pendulum to operate at a faster rate or frequency. The windings 173, 176 and 177 are when energized so poled as to aid the permanent magnet so as to avoid weakening of the permanent magnet as might be the case if they were bucking its magnetomotive force. Rectified alternating current is used so as to obtain the function of dropping of the relay R⁵ immediately upon the cessation of the alternating current.

The relay R⁴ is so controlled that it is de-energized when the main spring 178 is especially fully wound up, that is, is wound up to a point where contacts 182—183 open, as it would be if the escapement did not quite keep up with the synchronous winding motor SM[12] and when deenergized it speeds up the escapement clock for reasons above given. The relay R[4] is however also deenergized when the contact 182 is dead by reason of being out of contact with the contact pin 180. This control of the relays R[4] and R[5] is accomplished by connecting the pin 180 electrically to the gear 181, which in turn is connected by the brush 186 directly to the output side of rectifier RI[5] and by feeding either the spring contact 182 alone or both of the contact springs 182 and 183 with energy from this rectifier. The spring contact 182 is connected to relay R[5] through the medium of slip ring 162 and the the contact 183 is connected to the relay R[4] through the medium of slip ring 163 by a wire passing through a hole in slip ring 162. If the main spring 178 is fully wound the contacts 180—182 are closed with contacts 182 and 183 still in engagement, thus energizing relays R[4] and R[5], but if the main spring is slightly over-wound because the escapement 172—175 is running slower than the winding motor, that is, is running slower than the cycle passage of the alternating current, the relay R[4] drops although the relay R[5] remains energized, thereby causing the pendulum to be speeded up. Putting this in different words, after a temporary current cessation both of the relays R[4] and R[5] are in retracted conditions. When the main spring is fully wound the relays R[4] and R[5] pick up and by closure of their front contacts 174 and 179 energize the sucking winding 173 thereby reducing from normal the downward pull on the pendulum 172. This causes the pendulum to run abnormally slow and causes winding motor SM[12], which was substituted for the winding motor SM[13] when the relay R[5] picked up, to gain with respect to the escapement 172—175, resulting in the opening of contacts 182—183 and in the deenergization of relay R[4]. With the relay R[4] now deenergized the boosting winding 176—177 are energized thereby causing the escapement to run a little fast resulting in picking up of relay R[4]. This relay R[4] therefore periodically picks up and drops to maintain the escapement in synchronism with synchronous motor driven winding apparatus. The worm wheels 228 and 229 and the worms 230 and 231 have such a gear ratio that the winding shaft 242 operates at exactly 1 R. P. H. when the low speed synchronous motor SM[12] operates at synchronous speed from alternating current of regulated frequency and will operate at exactly 3 R. P. H. when the high speed synchronous motor SM[13] operates at synchronous speed from the regulated source of alternating current. The gear ratio from main spring gear 181 to the shaft 233 is one to one, because gears 181 and 234 have the same number of teeth and pinions 239 and 239a have the same number of teeth. In other words, when the pendulum 172 operates at correct speed and the winding shaft is rewound by the low speed synchronous motor SM[12] the shafts 242 and 233 operate at the same speed of 1 R. P. H.

*Operation Fig. 1.*—Under normal conditions, namely, when alternating current is present and when there has not been a current cessation for sometime, the master clock MC[2] is fully wound with the relay R[5] energized and through its front contact 185 holding closed an energizing circuit for the low speed synchronous winding motor SM[12]. The relay R[4] will, of course, be at times energized and at other times deenergized to cause the escapement mechanism to run an average speed such that the contacts 182—183 remain at the point of barely touching for reasons already given.

At the fifty-nine minute position of the sustained power electric clock the contact 188 slips off of the cam K[14] thereby causing contacts 187—188 to open and contacts 187—189 to close. These contacts 187—188 and 189 may be used to control a secondary clock. At the end of the hour (sixty minute position) of the master clock the contact 187 also slips off of the cam K[14] as a result of which contacts 187—188 close and contacts 187—189 open, so that the secondary clocks when used all start from the sixty minute position in synchronism and operate again at the normal rate. Also, it will be noted since both of the windings associated with the permanent magnet PM are deenergized during a current cessation and also during the rewinding operation that the sustained power electric clock will during this time be adjusted to normal speed adjustment, and therefore will keep substantially correct time. It should be observed that rewinding motor SM[13] has two-pole characteristics whereas synchronous motor SM[12] has six-pole characteristics therefore the main spring 178 is rewound at three times normal rate so long as A. C. power is available with the relay R[5] assuming its deenergized position. This is desirable in that it allows the clock to operate unregulated only during one and one-half times the period of the current cessation.

Referring to the drawings it should be understood that the various inventions and the various forms illustrating the same general invention have been shown specifically in some instances for the purpose of explaining their principles of operation and not with any attempt of limiting them to this particular construction. Referring to Fig. 1, for instance, the embodiments of the sustained power electric clock illustrated therein, although it has been illustrated as a master clock and is particularly applicable to perform a master-clock function it should be understood that it may be used as a mantle clock of the sustained power type.

Referring again to Fig. 1 it will be observed that after each current cessation the escapement portion of the clock will keep on operating causing the main spring 178 to run down. This causes contacts 182—183 to reclose but they remain ineffective since with contact pin 180 out of engagement with contact spring 182 no current can flow to either of the relays R[4] and R[5]. Furthermore there is no current now available. At the end of the current cessation current can flow through back contact 185 of relay R[5] thereby causing the spring to rewind at triple speed while it is running down at normal speed. Eventually the main spring will be fully wound up causing contact spring 182 to engage contact pin 180. This will cause relays R[4] and R[5] to both pick up. With relay R[5] up it will deenergize high speed synchronous motor SM[13] and will energize low speed synchronous motor SM[12]. This will cause the mainspring to be rewound at normal rate. Since under this condition (relays R[4] and R[5] both up) the pendulum 172 is regulated slightly slow, so that the rewinding will continue to gain, it will be seen that eventually the contacts 182—183 will open. When this occurs the relay R[4] is deenergized to cause the permanent magnet to be slightly strengthened to thereby cause the pendulum to speed up slightly in its frequency so that eventually the contacts 182—183 are again opened. This is repeated over and over again to thereby keep the escapement portion of the clock in average synchronism with the rewinding portion of the clock.

*Structure Figs. 2 and 3.*—In Fig. 2 has been shown a modified form of the invention illustrated in Fig. 1. In this form of the invention a balance wheel type escapement mechanism has been resorted to and the effective length of its hair-spring 10 (Fig. 3) is varied to thereby change the rate of oscillation of the balance wheel. This variation of the effective length of the hair-spring is accomplished by two opposing bi-metallic thermal elements 12 and 13. Each of these elements comprises two thin pieces of metal having different coefficients of expansion and welded together. Heating of the element 12 above that of element 13 causes them to be bent toward the left to cause the insulating block 15 provided with a metallic loop 16 through which the spring 10 passes to move toward the left to shorten the effective portion of the hair-spring 10 and to increase the frequency of oscillation of the balance wheel 17. Similarly heating of the bi-metallic element 13 to a higher temperature than thermal element 12 causes both elements to be bent toward the right to thereby move the insulating block 15 and loop 16 toward the right to increase the effective length of the hair-spring 10 and to slow down the frequency of oscillation of the balance wheel 17, pallet fork 29, having ears 30 and engaging pin 3 in the balance wheel 17. These thermal elements 12 and 13 may be heated as by high resistance coils 22 and 23 by passing currents through one or both of these coils. Naturally the coil which received the highest average current becomes the hottest and causes it to dominate the other and become effective to increase or decrease the frequency of oscillation of the balance wheel, as the case may be. Obviously the coils 22 and 23 may be controlled like the coils 176—177 and 173 (Fig. 1), respectively, in the event a balance wheel type of escapement is used in the Fig. 1 structure.

In the Fig. 2 structure a different method of controlling the period of oscillation of the oscillatory mechanism is, however, employed. In this form of the invention the main spring (not shown) which drives the gear 25 may be wound in any suitable way as for instance by hand, although it is preferably automatically wound by a suitable motor (not shown). This main spring (not shown but see Figs. 1 and 2 of my Patent No. 2,331,267, granted October 5, 1943) drives the escapement wheel 26 through the medium of gears 27 and 28 and pinions 31, 32 and 33 and shaft 34. This shaft 34 through the medium of the spiral spring 35 drives gear 36, pinion 37, fly wheel 38 and contact arm 39 contained on a shaft 40. By this construction the contact arm 39 moves at a uniform rate instead of by the jerky motion of the escapement wheel 26. The contact arm 39 rotates and wipes on an internal contact ring composed of contact segments 41, 42 and 43. A similar contact arm 49 rotates in and wipes on an internal contact ring composed of contact segments 51, 52 and 53. The contact arm 49 is at times rotated by a synchronous motor SM¹ through the medium of pinion 55 and gear 56. The clock hand 64 is driven at a reduced speed through the medium of pinions and gears 57, 58, 59, 60, 61, 62, 63 and 65. The various gear ratios and the speeds of escapement wheel 26 and pinion 55 are such that under normal power available conditions the contact arms 39 and 49 operate at the same speed and the clock hands 24 and 64 operate at the same speed which is much lower. These clock hands operate preferably at 1 R. P. H. whereas the contact arms 39 and 49 preferably operate at a much higher speed of say one revolution in two seconds.

It will be observed that shaft 40 is connected to one terminal of the source of alternating current of regulated frequency whereas the shaft 50 is connected to the other terminal of this same source, which source also supplies alternating current to the synchronous motor SM¹. Both of the contact arms 39 and 49 rotate normally in a clock-wise direction. It is readily seen that if these contact arms are in exact synchronism that the circuits for neither of the heating coils 22 or 23 is closed. This is true because when brush 39 shifts from coil 22 to coil 23 the brush 49 shifts from coil 23 to coil 22. The segments 42 and 52 are blanks, that is they have no wire connected thereto. This will be more fully described in the operation of this form of the invention.

*Operation Fig. 2.*—Let us first assume that alternating current is supplied by the alternating current system having its frequency regulated to correctly manifest the passing of time and conventionally shown by the source AC. This alternating current will operate the synchronous motor SM¹ to thereby cause the contact arm 49 to rotate at substantially one-half revolution per second. Let us also assume that the escapement clock including the balance wheel 17 is so regulated that it will cause the contact arm 39 to rotate at substantially one-half revolution per second. The two clock hands 24 and 64 will, therefore, run at substantially 1 R. P. H. Let us further assume that the contact arms 39 and 49 are in exact synchronism under which condition the contact arm 39 engages segments 41, 42 and 43 when the contact arm 49 engages segments 51, 52 and 53 respectively. In other words, the contact arm 39 shifts from the circuit for coil 22 to the circuit of coil 23 at exactly the time when the contact arm 49 shifts from the circuit of coil 23 to the circuit of coil 22 so that neither of these circuits are completed. During all other positions of these contact arms 39 and 49 when operating at the same speed, neither of these circuits is completed. The two bi-metallic members 12 and 13 thus remain in their middle position and the hair-spring 10 remains adjusted in its average speed, that is, correct speed position.

Let us now assume that for some reason or another the contact arm 49 rotating clockwise starts to gain with respect to arm 39. Let us, in fact, assume that it has gained to an extent of 30°. A circuit will therefore be closed to the coil 22 via the A. C. supply, arm 49, segment 53, and arm 39, segment 43. Since arm 49 leads arm 39 by 30 degrees, and since each segment 43 and 53 represents 120 degrees of the sweep respectively of the arms 39 and 49, the circuit to coil 22 will be closed $30/120$ or one fourth of its maximum heating value. The bi-metallic element 12 will, therefore, bend toward the left and will cause the loop 16 to slide toward the left on the hair-spring 10 to reduce the effective length of this hair-spring and increase the frequency of the oscillatory unit comprising the balance wheel 17 and hair-spring 10. This will, of course, cause the escapement clock to increase its speed until the two contact arms 39 and 49 are again in exact synchronism. During this catching up of the balance wheel clock mechanism, the extent of heating of the element 12 is, of course, gradually reduced.

Had the synchronous motor portion of the sustained power electric clock of Fig. 2 gained to a greater extent the extent of heating of bimetallic element 12 would have been greater and the escapement portion of this sustained power electric clock would have been speeded up proportionally more. This, however, is true only within a certain limit. If for any reason the synchronous motor portion should have its contact arm 49 gain to an extent of more than 120°, which should not happen in practicing the invention, the various parts being so designed that this will not occur during such frequency of current changes as occur on power systems. If in fact the contact arm should gain to extent of more than 120° both of the coils 22 and 23 would be intermittently energized but the coil 22 would be energized for longer time periods than would coil 23 until contact arm 49 has gained a full 180 degrees under which condition both coils would be energized to the same extent, namely, during one sixth of the total time. These operating conditions as just explained do not occur in ordinary practicing of the invention but they could occur under unusual circumstances such as might be brought about for experimental purposes or after a temporary current cessation. In practice neither of the two arms 39 or 49 should ever gain over the other arm to an extent greater than 120°.

Obviously, if the contact arm 49 loses wtih respect to contact arm 39 similar results occur except for the fact that in this case the coil 23 and its thermal element 13 are heated. In this case the thermal element 13 is bent toward the right to cause the loop 16 to slide to the right on the hair-spring 10 to cause the effective length of the hair-spring 10 to be lengthened. This, of course, causes the balance wheel escapement to slow down and eventually re-establish synchronism between contact arms 39 and 49.

In order to afford adjustment of the effective length of the hair-spring during power-off conditions, the thermal block 66 on which the two thermal elements 12 and 13 are mounted is mounted adjustably on the fixed block 68. This is accomplished by loosening the two screws 67 contained in a slot in the block 68 and then sliding the entire thermal unit consisting of thermal elements 12 and 13 mounted on fixed block 68, to the proper position, namely, the position where the loop 16 causes the escapement clock to keep correct time. This must, of course, be done when both of the elements 12 and 13 are at normal room temperature to get the best results although thermal elements 22 and 23 by opposing each other produce no movement due to change in room temperature. In other words, manual adjustment of the hair-spring for normal speed and automatic adjustment for both high and low speed of the clock mechanism is provided for.

The applicant has thus disclosed three forms of sustained power electric clocks, namely, the form shown in Fig. 1, the form shown in Figs. 2 and 3, and a clock mechanism such as shown in Fig. 1 but which employs an escapement wheel pallet and hair-spring where the hair-spring is adjusted by thermal elements such as shown in Figs. 2 and 3 but wherein the circuits for the two heating coils 22 and 23 are controlled in a manner as the coils 173 and 176—177 of Fig. 1 are controlled.

It will be understood that it is the slow-acting feature of the thermally controlled frequency adjusting means disclosed in Figs. 2 and 3 that permits intermittent control current to be used in this Fig. 2 and 3 structure. Also, there may be times when both of the heating coils 22 and 23 are intermittently heated in which case the adjustment of frequency will be in the direction in which the hottest of the two thermal elements 12 or 13 acts when heated.

One of the features of the Figs. 2 and 3 structure is that it enables the electric clock portion of the system to be located in one room and allows the mechanical portion thereof to be located in another room. As a result of such locations of these mechanisms each of the two units may serve as a time indicating means of which one includes clock hand 24 and the other includes a clock hand 64. One of these clocks then functions as an ordinary self-starting synchronous motor clock; whereas, the other constitutes a mechanical clock which has the frequency of its oscillatory member adjusted to keep it operating in synchronism with alternating current cycle passage. Obviously, an escapement clock may be likewise adjusted from a remote point by a synchronous motor and associated contact mechanism as shown.

It should be understood that the wipe contacts 39, 41, 42 and 43 may be replaced by cam operated contacts 39a, 41a, 42a and 43a illustrated in Fig. 4 of the drawings. It will be seen that the sudden shift from one circuit to the other takes place in shifting roller from segment 43a to 41a (Fig. 4) the same as it does in shifting contact 39 from segment 43 to segment 41 and this in each case if rotation is too fast causes the "slower" circuit to be selected.

It should be understood that the two synchronous motors $SM^{12}$ and $SM^{13}$ may be replaced by the two-speed synchronous motor of Fig. 3 of Patent No. 2,490,340, if desired. If this is done the "low" wire of the motor is connected to the front contact 165 of the relay $R^5$ and the "high" wire is connected to the back contact 185 of this relay.

Having thus shown and described several embodiments of the present invention it should be understood that the specific several embodiments of the invention that have been illustrated have been selected as examples only of the form of the invention may take and these illustrations have facilitated description of the underlying principles of the invention and how these principles may be used in practicing the invention. It should be understood that these specific forms of the invention are not necessarily employed in practicing the invention and that various changes, modifications and additions may be made so long as the changed structure comes within the scope of the following claims.

What I claim as new is:

1. In a sustained power electric clock; the combination with a synchronous motor device operated from a source of alternating current having its frequency regulated to correctly manifest the passing of time; a time lapse manifesting means including a speed governing device, a local source of energy for driving said time lapse manifesting means, and time indicating means controlled by said governing device; means including a first circuit and a second circuit and control means operated thereby for causing said governing device to operate faster and slower respectively dependent on which of said circuits is closed the greater amount of time; and means including circuit controlling devices governed jointly by said speed governing device and said synchronous motor device for intermittently closing said first circuit, intermittently closing said second circuit or intermittently closing both of said circuits for time intervals dependent upon the extent to which one of said devices has gained or lost with respect to the other of said devices.

2. In a sustained power electric clock; the combination with a synchronous motor device operated from a source of alternating current having its frequency regulated to correctly manifest the passing of time; a time lapse manifesting means including a speed governing device, a local source of energy for driving said time lapse manifesting means, and time indicating means controlled by said governing device; means including a first circuit and a second circuit and control means operated thereby for causing said governing device to operate faster and slower respectively dependent on which of said circuits is closed the greater amount of time; and means including governing means governed jointly by said speed governing device and said synchronous motor device for intermittently closing said first circuit, intermittently closing said second circuit or intermittently closing both of said circuits for time intervals dependent upon the extent to which one of said devices has gained or lost with respect to the other of said devices, said last mentioned means including contacts for closing either of said circuits a maximum of one-third of the time and closing both of said circuits each a maximum of one-sixth of the time.

3. In a sustained power electric clock, an oscillatory means, a source of alternating current of regulated frequency regulated to have an average frequency such as to correctly manifest the passing of time, and electro-responsive means and control means operated thereby controlled by current from said source for adjusting the natural frequency of oscillation of said oscillatory means to a fixed high value, a fixed low value or a fixed medium value dependent on the extent the alternating current cycles and the cycles of operation of said oscillatory means have gained or lost with respect to each other and dependent on whether alternating current is or is not actually supplied to the clock.

4. In a clock; the combination with a time member; a source of stored energy for driving said time member; an oscillatory member driven by said time member and determining the speed of operation of said time member to cause said time member to substantially correctly manifest the passing of time when said oscillatory member is adjusted to oscillate at its normal rate; a time shaft; control means including a low speed synchronous motor energized from a source of alternating current of regulated frequency for driving said time shaft when it is either in exact synchronism or is slightly in advance of exact synchronism with respect to said time member and including a high speed synchronous motor energized from said source of alternating current for driving said time shaft when it is tardy with respect to said time member due to a current cessation; and means controlled by said control means for adjusting said oscillatory member to oscillate at a lower than normal rate when said time shaft is slightly in arrear with respect to said time member, adjusting said oscillatory member to oscillate at a higher than normal rate when said time shaft is slightly in advance of said time member and for leaving said oscillatory member adjusted at its normal rate when said time shaft is tardy with respect to said time member due to a current cessation.

5. In a clock; the combination with a time member; a source of stored energy for driving said time member; an oscillatory member driven by said time member and determining the speed of operation of said time member to cause said time member to substantially correctly manifest the passing of time when said oscillatory member is adjusted to oscillate at its normal rate; a time shaft; control means for driving said time shaft at a low synchronous speed from said source of alternating current of regulated frequency when said time shaft is either in exact synchronism or is slightly in advance of exact synchronism with respect to said time member, but driving it at a high synchronous speed when said time shaft is tardy with respect to said time member due to a temporary current cessation; and means controlled by said control means for adjusting said oscillatory member to oscillate at a lower than normal rate when said time shaft is slightly in arrear with respect to said time member, adjusting said oscillatory member to oscillate at a higher than normal rate when said time shaft is slightly in advance of said time member and for leaving said oscillatory member adjusted at its normal rate during a cessation of current from said alternating current source and also when said time shaft is driven at a high synchronous speed.

6. In a clock; the combination with a time member; a source of stored energy for driving said time member; an oscillatory member driven by said time member and determining the speed of operation of said time member to cause said time member to substantially correctly manifest the passing of time when said oscillatory member is adjusted to oscillate at its normal rate; a time shaft; control means for driving said time shaft at a low synchronous speed from a source of alternating current of regulated frequency when said time shaft is either in exact synchronism with respect to said time member or is slightly in advance of exact synchronism, but driving it at a high synchronous speed when said time shaft is tardy with respect to said time member due to a temporary current cessation; and means controlled by said control means for adjusting said oscillatory member to oscillate at a lower than normal rate when said time shaft is slightly in arrear with respect to said time member, adjusting said oscillatory member to oscillate at a higher than normal rate when said time shaft is slightly in advance of said time member and for leaving said oscillatory member adjusted at its normal rate during a cessation of current from said alternating current source and also when said time shaft is driven at said high synchronous speed.

7. In a clock; the combination with a source of regulated frequency alternating current regulated to correctly manifest the passing of time; a time member; a source of stored energy for driving said time member; an oscillatory member oscillated by said time member and determining the speed of operation of said time member to substantially correctly manifest the passing of time when said member is adjusted to oscillate at a normal rate; a synchronous motor; a time shaft driven by said synchronous motor energized from said source of alternating current; means including a first circuit which, if energized, adjusts said oscillatory member to oscillate at a higher than normal rate; means including a second circuit which, if energized, adjusts said oscillator member so as to oscillate at a lower than normal rate; and means controlled in accordance with the relative positions of said time member and time shaft for energizing said first circuit when said time shaft has gained with respect to said time member, for energizing said second circuit when said time shaft is tardy with respect to said time member and for energizing neither of said circuits during an alternating current cessation, whereby deenergization of both of said circuits due either to the control of said means or an alternating current cessation causes said oscillatory member to oscillate at its normal rate.

8. In a clock; the combination with a source of regulated frequency alternating current regulated to correctly manifest the passing of time; a time member; a source of stored energy for driving said time member; an oscillatory member biased to a neutral position and oscillated by said time member and determining the speed of operation of said time member to substantially correctly manifest the passing of time when said oscillatory member is adjusted to oscillate at its normal rate; a synchronous motor; a time shaft driven by said synchronous motor energized from said source of alternating current; means including a first circuit which, if energized from said source of alternating current, increases said bias; means including a second circuit which, if energized from said source of alternating current, decreases said bias; and means controlled in accordance with the relative positions of said time member and time shaft for energizing said first circuit when said time shaft has gained with respect to said time member and for energizing said second circuit when said time shaft is tardy with respect to said time member, whereby deenergization of both of said circuits causes said oscillatory member to oscillate at its normal rate.

9. A clock of the alternating current dominated type comprising, an oscillatory timing means, a first time manifesting means indicating time in accordance with the frequency of operation of said oscillatory means, a first correcting means which if rendered effective increases the frequency of operation of said oscillatory means, a second correcting means which if rendered effective decreases the frequency of operation of said oscillatory means, a synchronous motor energized from a source of alternating current of regulated frequency, a second time manifesting means driven by said synchronous motor and correctly manifesting the lapse of time in accordance with the frequency of said source, and mechanism and control therefore controlled in accordance with the relative time manifesting conditions of said first and second time manifesting means for when said second time manifesting means is fast with respect to said first time manifesting means rendering said first correcting means effective and for rendering said second correcting means effective when said first time manifesting means is fast with respect to said second time manifesting means, said mechanisms being controlled by current derived from said source and being ineffective during an alternating current cessation.

10. In a clock; the combination with a source of regulated frequency alternating current regulated to correctly manifest the passing of time; a time member; a source of stored energy for driving said time member; an oscillatory member biased to a neutral position and oscillated by said time member and determining the speed of operation of said time member to substantially correctly manifest the passing of time when said oscillatory member is adjusted to oscillate at its normal rate; a time shaft; a synchronous motor energized from said source of alternating current for driving said time shaft; a first means and control means therefor controlled by the relative rotated positions of said time member and time shaft which if rendered active increases said bias; a second means and control means therefor controlled by the relative rotated positions of said time member and time shaft which, if rendered active decreases said bias; and means for rendering said first means active when said time shaft has gained with respect to said time member and for rendering said second means active when said time shaft is tardy with respect to said time member, whereby inactivity of both of said means causes said oscillatory member to oscillate at its normal rate, and means including said alternating current source for causing both of said means to remain inactive upon cessation of said alternating current.

11. In a sustained power electric clock; the combination with a source of stored energy; an oscillatory member oscillated by energy from said source and having an original natural frequency of oscillation to substantially correctly manifest the passing of time; a source of alternating current having its frequency regulated so that the average of said frequency correctly manifests the passing of time the instantaneous frequency of which may, however, vary; and means including control means therefor controlled by alternating current from said source for changing the adjustment of the natural frequency of oscillation of said oscillatory member so as to have a natural frequency above said original natural frequency when the frequency of said alternating current is temporarily high, for changing the adjustment of the natural frequency of said member so as to have a natural frequency below said original natural frequency when the frequency of said alternating current is temporarily low and for allowing said oscillatory member to return to its original natural frequency adjustment upon a cessation of said alternating current.

12. In a sustained power electric clock; the combination with a source of stored energy; an oscillatory member oscillated by energy from said source and having an original natural frequency of oscillation to substantially correctly manifest the passing of time; a source of alternating current having its frequency regulated so that the average of said frequency correctly manifests the passing of time the instantaneous frequency of which may however vary; a synchronous alternating current motor operated by current from said alternating current source; a shaft rotated in accordance with the frequency of oscillation of said member; and means including governing means governed by said synchronous motor and said shaft for increasing the natural frequency of oscillation of said oscillatory member above said original natural frequency if the relative extent of rotation of said motor has gained with respect to the extent of rotation of said shaft, for decreasing the natural frequency of oscillation of said oscillatory member below said original natural frequency if the relative extent of rotation of said shaft has gained with respect to the rotation of said motor and for allowing the frequency of oscillation adjustment of said oscillatory member to return to its original natural frequency adjustment upon deenergization of said motor due to a current cessation.

13. In a sustained power electric clock; the combination with a time lapse manifesting means including a speed governor and time indicating means; a source of power for driving said speed governor and time indicating means; a synchronous motor energized from a source of alternating current having its frequency regulated to correctly manifest the passing of time; and means including governing means governed jointly by said time lapse manifesting means and said synchronous motor for adjusting the speed adjustment of said speed governor to a higher value when said synchronous motor has gained with respect to said time indicating means, for adjusting the speed adjustment of said speed governor to a lower value when said synchronous motor has lost with respect to said time indicating means and for allowing restoration of said speed governor to its normal speed adjustment upon a cessation of alternating current from said source.

14. In a sustained power electric clock; the combination with a time lapse manifesting means, including a speed governor and time indicating means; a source of power for driving said speed governor and time indicating means; a synchronous motor controlled from a source of alternating current having its frequency regulated to correctly manifest the passing of time; and means including an electro-thermal element having current supplied thereto and governing means associated therewith governed jointly by said time lapse manifesting means and said synchronous motor for adjusting the speed adjustment of said speed governor to a higher value when said synchronous motor has gained with respect to said time indicating means, for adjusting the speed adjustment of said speed governor to a lower value when said synchronous motor has lost with respect to said time indicating means and for allowing the restoration of said speed governor to its normal speed adjustment upon cessation of alternating current from said source.

OSCAR H. DICKE.

REFERENCES CITED

The following references are of record in the file of this patent:

UNITED STATES PATENTS

| Number | Name | Date |
|---|---|---|
| 1,328,247 | Poole | Jan. 13, 1920 |
| 1,963,727 | Warren | June 19, 1934 |
| 2,091,841 | Warren | Aug. 31, 1937 |

FOREIGN PATENTS

| Number | Country | Date |
|---|---|---|
| 394,965 | Great Britain | June 22, 1933 |